United States Patent Office 3,275,352
Patented Sept. 27, 1966

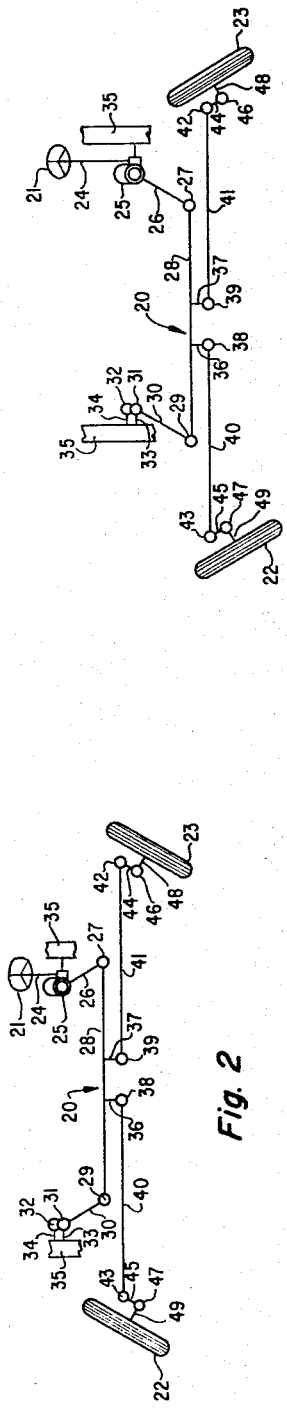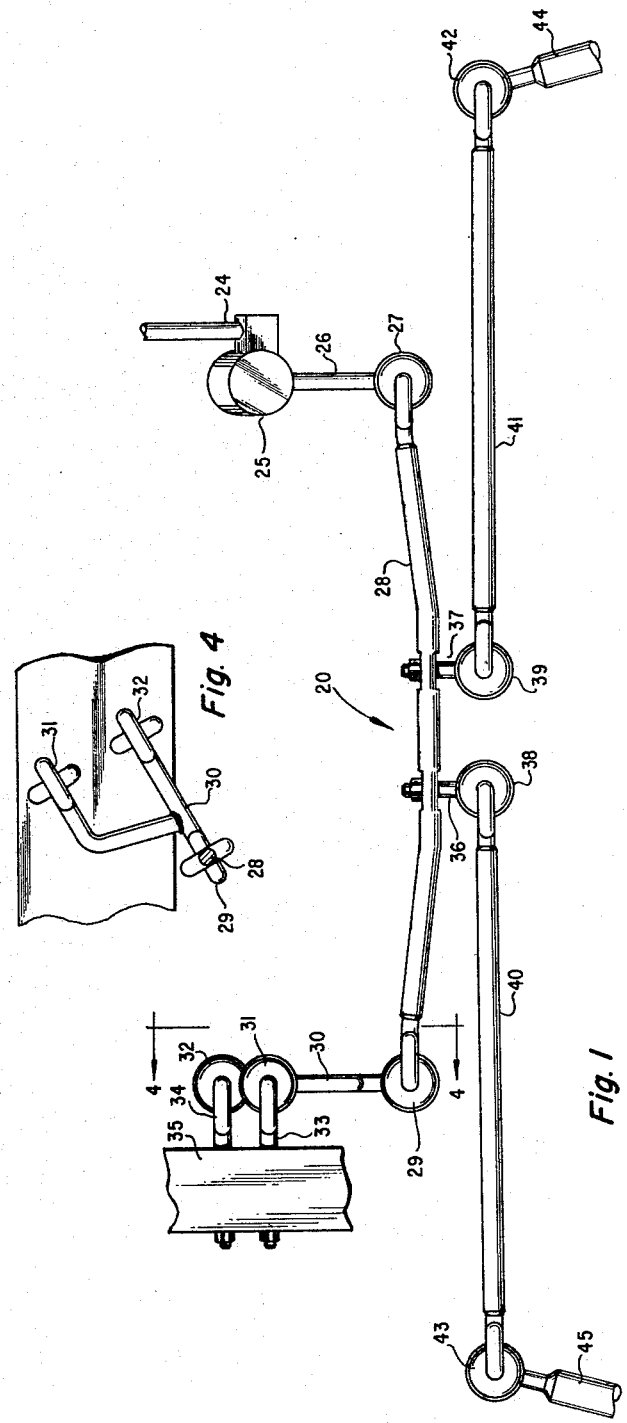
Fig. 1  Fig. 2  Fig. 3  Fig. 4

3,275,352
MECHANICAL LINKAGE JOINT
Vasalie L. Peickii, Hillsborough, Dan A. Christensen, Woodside, and John H. Bradfute, Santa Clara, Calif., assignors to Federal-Mogul Corporation, a corporation of Michigan
Original application Dec. 9, 1963, Ser. No. 330,518, now Patent No. 3,233,928, dated Feb. 8, 1966. Divided and this application Aug. 10, 1964, Ser. No. 401,746
12 Claims. (Cl. 287—85)

This invention relates to a mechanical linkage joint of the type which has two pieces that swing relatively to each other. This application is a division of application Serial No. 330,518, filed December 9, 1963 and now Patent No. 3,233,928, which was a continuation-in-part of application Serial No. 189,613, filed April 23, 1962 and now abandoned.

In contrast to the types of ball joints and hinges in which metal members directly engage each other and rotate relatively to each other, the present invention relates to a novel type of linkage in which a pair of metal members are joined together by an elastomeric connector which is bonded to both of the members. Typical types of assemblies where the invention may be used include steering gear links, universal joints, wheel suspensions, shock absorber arms, and many other places where ball joints and hinges have been used.

Considering as an example the use of the invention in automative steering rod linkages, it is known that each steering linkage system for the front wheels of an automobile requires several ball joints and that such joints are relatively expensive and usually require maintenance lubrication. The present invention makes it possible to provide a much less expensive type of linkage at each joint with even superior results. Thus, one object of the invention is to provide a simpler and more reliable connection which has no maintenance requirements over a long useful life.

The joint of this invention has substantially all of the advantages of a ball joint but in addition it is simpler, requires no maintenance, damps shock and vibration, and so transfers less of them from one rod to another, and is free from the possibility of wear which results from sliding contact. In many applications the joint of this invention has a much longer life than joints heretofore in use. Furthermore, the joint is fail-safe in that if the elastomer should fail completely, the interlocking metal members could still not come apart.

When used in a steering linkage, the invention provides flex joints that reduce the road and front wheel noise and vibration transmitted through the steering linkage, giving a quieter ride and a more solid sounding car. The joints have an inherent centering force and lack of friction, enabling alteration of the front-end geometry so as to lower the steering wheel rim force. Since the joints have no clearance between their moving parts, they have no free play at any time, in contrast to conventional joints in which the free play increases with wear; the joints of this invention have no wearing surfaces and remain tight during their entire service life.

Moreover, shock loads such as are caused when a front wheel drops in a chuck hole in a road have heretofore been transmitted to the steering gear box undiminished by a conventional linkage; whereas, in the present invention, the shock is dampened by each joint, and each joint through which the shock passes reduces the severity of the shock.

In the joint of this invention there are no wearing surfaces, so that the joint life can be made to equal the car life. No lubrication is needed, and maintenance is eliminated. Moreover, not only are the joints in themselves less expensive than conventional joints, but due to their lasting as long as the car, it is not necessary to make concessions to ease of replacement of them, and the tie rod joints can be made integral with the steering arm, for example.

When the joint of this invention is used in other applications similar advantages are obtained, as well as additional ones specific to the particular application.

Other objects and advantages of the invention will appear from the following description of some embodiments thereof.

In the drawings:

FIG. 1 is a plan view of a portion of an automobile steering linkage employing joints embodying the principles of the present invention.

FIG. 2 is a diagrammatic plan view showing a steering linkage like that of FIG. 1 when a right turn is being made by the vehicle.

FIG. 3 is a view similar to FIG. 2 showing the position of the elements in the linkage when a left turn is being made by the vehicle.

FIG. 4 is a fragmentary view in section, taken along the line 4—4 in FIG. 1.

Figure 5:
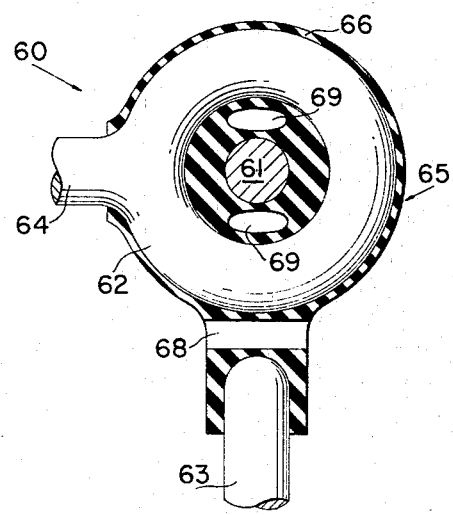
FIG. 5 is an enlarged view in section of a flex joint embodying the principles of the invention.
Figure 6:
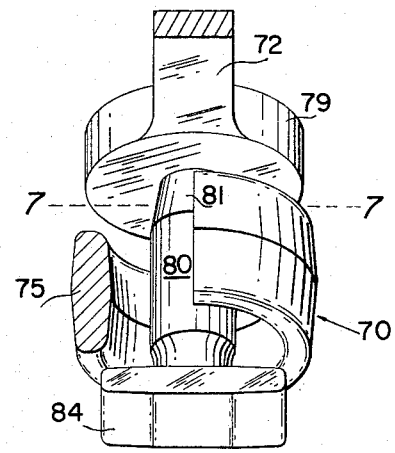
FIG. 6 is a view in perspective of a modified form of joint embodying the principles of the invention, with a portion cut away and shown in section and with the elastomer omitted.
Figure 7:
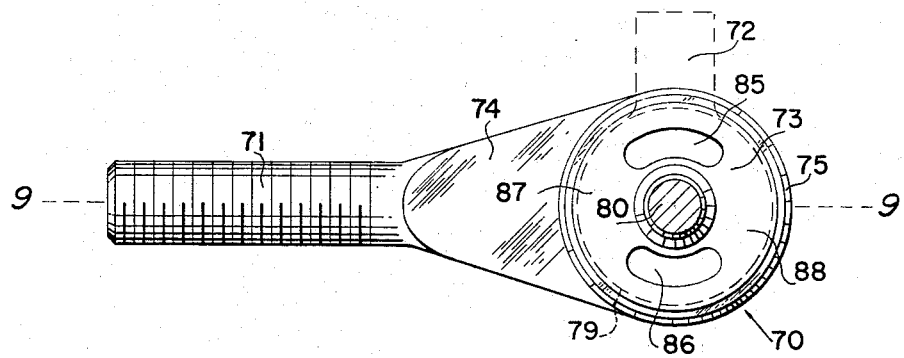
FIG. 7 is a view in plan and in section taken along the line 7—7 in FIG. 6, with the elastomer shown.
Figure 8:
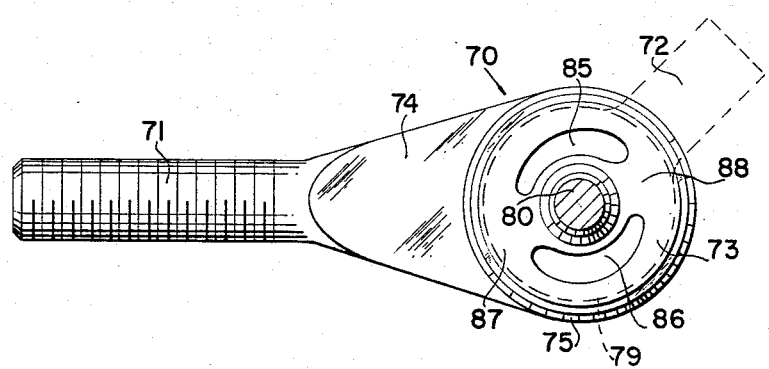
FIG. 8 is a view similar to FIG. 7 showing the joint in a different rotational position.

In order to illustrate the utility of the invention and to give some idea of its purpose and function, FIGS. 1 to 4 show a portion of the steering linkage at the front end of an automobile. Thus, the linkage 20 transmits the turning from a steering wheel 21 to front wheels 22 and 23. A rod 24 connects the steering wheel 21 to a gear box 25 from which a rod 26 passes to a joint 27 of the present invention. From the joint 27, a rod 28 extends across to the opposite side of the automobile to a similar joint 29, whence a clevised rod 30 is connected to a pair of such joints 31 and 32, and rods 33 and 34 lead from the joints 31 and 32 to a frame 35. The gear box 25 is bolted to the frame 35. Near its center, the rod 28 is connected to short rod members 36 and 37 that are respectively joined to joints 38 and 39 of this invention; the joints 38 and 39 are connected by respective rods 40 and 41 to joints 42 and 43, which in turn are connected by rods 44 and 45 to members 46 and 47 that support spindles 48 and 49 for the wheels 22 and 23. Each one of the joints 27, 29, 31, 32, 38, 39, 42, and 43 is shown as one that embodies the present invention. It will be noted that the two rods which lead to or from any joint may take various positions as shown by FIGS. 2 and 3 and may or may not lie in the same plane.

Each joint 27, 29, 31, 32, 38, 39, 42 and 43 may be constructed like the joint 70 of FIGS. 6–11, or like the joint 60 of FIG. 5. The joint 60 of FIG. 5 has two loops or eyes 61, 62 each forming the end of a metal rod 63, 64 or having a stem which is threaded to the end of a rod, either in the plane of the loop or not. One loop 61 may be a completely closed circle forged for that purpose, while the other loop 62 may be inserted and closed around it and may be closed completely by welding, or may be left with the looped end of the rod flush against the stem. In either instance, the device is fail-safe, due to the interlocking of the two loops 61 and 62.

The two stems 63, 64 or 71, 72 may be held in any relative position desired during molding. For convenience, the drawings show them held in the position where they are perpendicular to each other, but they could be held at an angle and molded at rest in that position, or they may be molded perpendicular and the joint stressed to that position, whichever gives the most desirable results for a particular instance. The adaptability of the invention in this particular is quite great, enabling the rest position to be determined at the time of molding. The option of stressing the joints on assembly allows the engineer designing a linkage system to vary the turning force of the steering wheel at any position of the linkage.

An elastomer is used to fill the joint. In FIG. 5 the elastomer member 65 is one integral member bonded to both loops 61 and 62 and has two planar portions, as shown in FIG. 1, that lie along the plane of respective eyes 61, 62 filling both eyes 61 and 62 and joining each eye to its adjacent eye. Thus, the member 60 is shaped generally like two intersecting discs filling the space enclosed by the eyes 61 and 62 and also covering and bonded to the metal of the eyes 61, 62.

Any elastomer suitable for the use involved is satisfactory, the necessary strength and flexibility being provided by proper choice of polymer and by compounding procedures well known in the art.

When one rod 63 is moved relatively to the other rod 64 to flex the joints, the elastomer is deformed, setting up stresses as it moves into the shape shown. Thus, the one loop 62 moves closer to the other loop 61 during the turn with a force tending to return it to the original position, both by the tensile force and the compressive force exerted on the elastomer 65.

Thus, the action of the joint of this invention is different than that of a normal hinge or a metal joint of this type in that there is no stressless pivoting, but instead, the members are turned in a way which sets up stress. They are held together without having to be concerned with fits, finish, lubrication and so on, all these being taken care of by the inherent properties of the elastomer 65.

An important feature of the invention is the fact that the loops can rotate about the center of the joint against relatively light force in the elastomer, but the loops are restrained from relative translation by considerably greater elastomeric force. The reason is that elastomers have a much lower shear modulus than tensile modulus for any given elongation. In other words, the elastomer is soft in shear but stiff in tension and compression. This helps to retain proper alignment during operation.

In any particular installation, one loop of the double-loop joint is loaded torsionally and the other loop is loaded as a diaphragm. Since the diaphragm has essentially tensile loading, it is possible to remove certain portions of the elastomer from the diaphragm loop and thereby to reduce the rotary stiffness of the joint by a substantial amount. It is sometimes advisable to remove a portion of the elastomer or to so mold it that it is not present in order to reduce some of the effects noted in the form of the invention previously described. Thus, in the joint 60, openings 69 extend through the body 65 along the axis of the rod 63 on both sides of the eye 61. The openings 69 are diametrically opposite and are symmetrical to a diameter that lies perpendicular to the axis of the rod 64. These openings reduce the force required to rotate the rods 63 and 64 about the center of the joint 60 while effecting only a relatively slight loss in stiffness so far as tension and compression are concerned.

Figure 10:
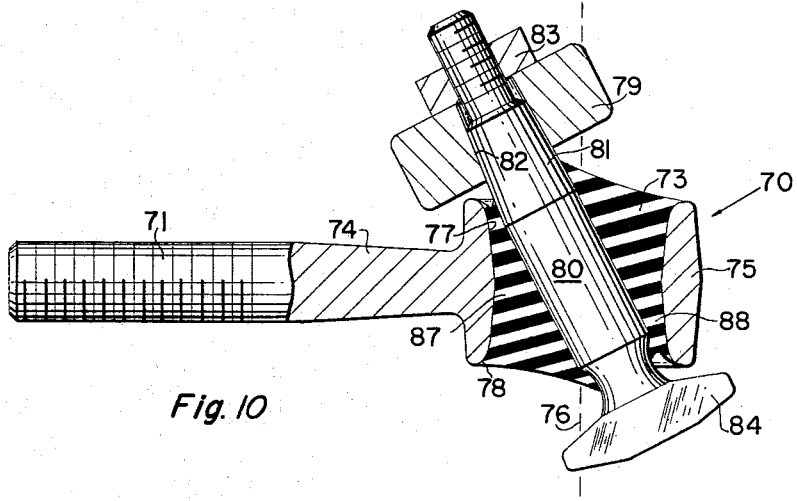
FIG. 10 is a view similar to FIG. 9 showing the joint in an extreme angularly flexed position.
Figure 9:
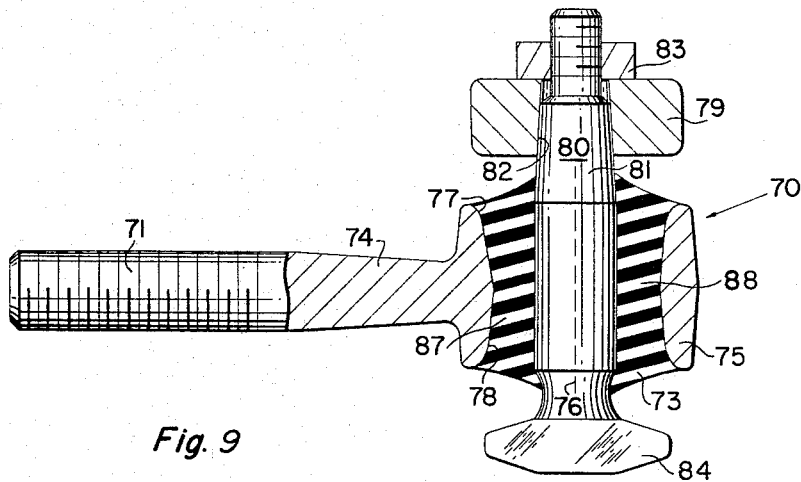
FIG. 9 is a view in section taken along the line 9—9 in FIG. 7.

The joint 70 of FIGS. 6 through 10 illustrates further features of the invention, especially what happens when openings are provided in the elastomer. Since removal of the rubber from the diaphragm loop reduces the rotary stiffness of the joint substantially, while barely affecting the joint's stiffness in tension and compression, a straight pin or stud may be substituted for the loop 61 of FIG. 5 with little or no impairment of its function. This results in the joint 70, where two rods, 71 and 72, are poined together by an elastomeric body 73. The rod 71 is provided with a widened end portion 74 having a ring 75 which may be substantially longer along its axis 76 than the thickness of the rod 71, and which may have a generally rectangular cross-section allowing for curves needed for forging, relieved end portions 77 and 78 being preferably provided to enable a greater turning radius, as shown in FIG. 10.

The rod 72 has an end ring 79 to which is secured a stud 80, providing an end portion preferably perpendicular to the rod 72. Preferably, a tapered end portion 81 of the stud is driven into a tapered opening 82 in the ring 79 and locked there by a nut 83. If desired, the stud 80 may be an integral bent-over portion of the rod 72. The stud 80 may be generally cylindrical or may have another shape, and it may be considered as a pivot pin movable inside the ring 75 (an external anchor for the elastomer). The end portion or stud 80 extends all the way through the ring 75 and is provided at its opter end with a fail-safe or locking device which may simply be a perpendicular forging 84 that is enough longer than the inside diameter of the ring 75 to prevent its withdrawal in all rotational positions.

The elastomeric body 73 may be the full height of the ring 75 or even higher in the center, and it may completely encircle the stud 80 and the inside of the ring 75. In this preferred form of the invention, the body 73 is provided with a pair of openings 85 and 86 parallel to the axis 76 of the ring 75. Preferably, the openings 85 and 86 extend all the way through the body 73 in order to make it easier to get rid of dirt, but the function is not greatly affected by a partial filling with a thin web. These openings are arranged to lie generally diametrically opposite each other at the side with respect to the rod 71 rather than in line with the rod 71; that is, they do not lie within the area represented by an extension of the rod 71 through the end portion or along the actual loading axis for the joint. Thus, the elastomer fills the spaces 87 and 88 between the stud 80 and the ring 75 that are axially in line with the rod 71, while the remainder of the space between the ring 75 and stud 80 may be vacant or may be partially filled. In effect, the portions 87 and 88 act as blocks of elastomer which are diametrically opposite, are axially aligned, are of equal size and are spaced apart (by the openings 85 and 86). The openings 85 and 86 may be arcuate as shown, or they may be another shape.

The structure of claims 6–10 enables an increase in the joint bearing area, which in FIG. 5 is approximately a square with its sides equal to the diameters of the rods 63 and 64 and their loops 61 and 62 which are linked together. In the case of the joint 70, the bearing area has been increased, increasing the height of the ring 75 and its elastomeric filling 73; that is, the distance the ring 75 extends parallel to the stud 80 or the amount that the elastomeric filling 73 extends within the ring 75 and along the axial direction of the end portion 80. This structure eliminates the diaphragm loop of rubber and with it certain force characteristics which, for many installations such as certain automative tie rod ends, are undesirable. Automotive tie rod joints achieve their best results when there is minimum deflection under high axial loads and minimum torsional stiffness, especially in the higher deflection range. The rubber volumes (the blocks 87 and 88) lying along the axis of the rod 71 are, respectively, under tension and compression with axial loading, which is under tension and which is under compression depending on whether the rod 71 is being pulled or whether it is pushed. The rubber at the sides (where the holes 85 and 86 are) is loaded in shear, and since, as has been pointed out before, this is essentially less efficient, the structure of FIGS. 6 to 10 gives ideal results, with the stud 80 lying along the center line 76 of the loop 75, and the rubber blocks 87 and 88 connecting them along the axis of the attaching rod 70 for the loop 75, the blocks 87 and 88 being as wide as the stud 80 and as high as the ring 75. (The rods 70 and 71 may be offset or curved; what is important is the loading axis.)

Figure 11:
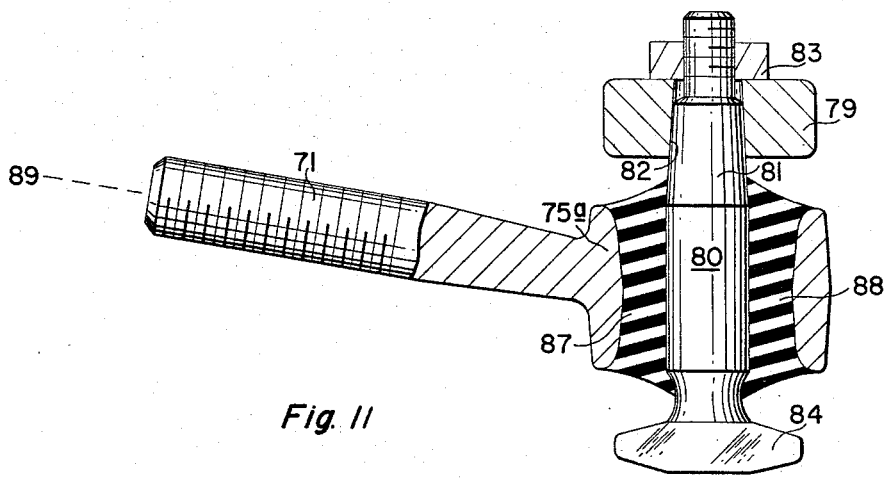
FIG. 11 is a view similar to FIG. 9 of a slightly modified form of the invention generally similar to that of FIG. 9.

The structure of FIG. 11 illustrates a modification of the device of FIGS. 6 through 10 wherein the ring 75a is tilted with respect to the rod 71. This is perfectly feasible and for some uses may given improved results. The tilting may be in different angles, but it will be noted that the end portion or stud 80 is centered with respect to the axial line 89 of the rod 71 and is also centered in the ring 75a. Note that the ring 75a is centered with respect to the axial line 89, so that there will be the same amount of elastomer above as below the line 89.

It will be appreciated that in some instances the fail-safe precautions are not needed. Not only can the member 84 be eliminated; the ring 75 does not need to extend full circle or even be a ring so long as rigidity is provided by an anchor on both sides of the blocks 87 and 88. What appear here as openings 85 and 86 because of covering of the full periphery of the stud 80 and of the inner periphery of the ring 75, may be gaps or omissions, the blocks 87 and 88 being sufficient for many purposes.

To those skilled in the art to which this invention relates, many additional changes in construction and widely differing embodiments of the invention will suggest themselves without departing from the spirit and scope of the invention as defined in the claims.

What is claimed is:

1. A steering joint comprising a pair of rod means lying in approximately parallel planes and at least one of which has a loop on one end, the loop having an axis, the other said rod means having an end portion extending into said loop along the axis of the loop and having means interlocking said end portion with said loop and preventing retraction from said loop, and an elastomeric connecting means within said loop and molded and bonded to both said loop and said end portion, said connection including two substantially diametrically opposite loading portions spaced by apertures defining voids, the said rod having said loop extending along the diametric axis of said loading portions, whereby said rod means can rotate about said joint against relatively light force in the elastomer due to said voids, said rod means being restrained by said loading portions from translation of the two rod means relative to each other by considerably greater elastomeric force, whereby a longitudinal force along the axis of the said rod means having said loop, tends to produce tension in said elastomeric connecting means on one side of said end portion and compression in said connecting means on the other side of said end portion and translation of such steering joint, which in turn act to cause relative rotation of the other said rod means in a plane approximately parallel to that of the first named rod means with resultant rotation of said end portion relative to the axis of said loop, whereby torsion is set up in said elastomeric connecting means along the plane of said loop, the level of torsional force being a fraction of what would be present in a solid said elastomeric connecting means because of said voids.

2. A steering joint between first and second relatively rotatable rods each having its own longitudinal axis, comprising a ring on the end of said first rod and generally axially in line therewith, said ring having an axis of its own, an end fitting on said second rod extending perpendicularly to the axis of said second rod and passing centrally and axially through said ring and having a terminal member on its end preventing retraction of said end fitting out of said ring, and a generally cylindrical elastomeric body bonded to and joining both said ring and said end fitting and substantially filling the space axially in line with the axis of said first rod and on both sides of said end fitting between said ring and said end fitting, said body having through openings parallel to said end fitting on both sides thereof and diametrically opposite one another outside of the space axially in line with the axis of said first rod, whereby a longitudinal force along the axis of said first rod produces tension in the said elastomeric body on one side of said end fitting and compression in said body on the other side of said end fitting and translation of said steering joint, which in turn acts to cause relative rotation of said second rod in a plane approximately parallel to that of said first rod, with resultant rotation of said end fitting relative to the axis of said ring, whereby torsion is set up in said body along the plane of said ring, the level of torsional force being a fraction of what it would be in a solid said body, because of said through openings.

3. The steering joint of claim 2 wherein said ring is circular and said openings are arcuate along arcs generally concentric with said ring.

4. The steering joint of claim 2 wherein the plane of said ring and body is tilted relative to the plane of said first rod.

5. A steering joint structure, including in combination a pivot pin, a pair of diametrically opposite, axially aligned, equal-size, spaced-apart elastomeric blocks bonded to said pivot pin, an external anchor having portions lying on diametrically opposite sides of said pin and bonded to the extreme opposite ends of said blocks, said pin being centered relative to said anchor, rod means secured to said pivot pin, and loading means secured to said anchor along the diametric axis of said blocks for applying load to said pin through compressive-tensile loading of said blocks along the axis of said blocks, whereby said pin and rod rotate relative to said anchor and said loading means at relatively light torsional stress over a substantial angle and translate with said anchor and loading means.

6. A steering joint structure, comprising a straight pivot pin, a pair of diametrically opposite, axially aligned, equal-size, spaced-apart elastomeric blocks bonded to opposite sides of said pivot pin, an external anchor having portions lying equidistant from and on opposite sides of said pin and bonded to and confining the extreme opposite ends of said blocks and axially in line with them, a first rod secured to one end of said pivot pin, and a loading rod secured to said anchor along the diametric axis of said blocks for applying load to said pin and said first rod through compressive-tensile loading of said blocks along the axis of said blocks, whereby said pin and said first rod rotate relatively to said anchor and said loading rod at relatively light torsional stress over a substantial angle and translate with said anchor and loading rod.

7. The steering joint of claim 6 wherein said anchor is a ring and wherein said loading rod is axially in line with said blocks, said blocks being spaced apart by voids between said ring and pin.

8. The steering joint of claim 7 wherein there is a projection on the other end of said pivot pin positively preventing said pin from being taken out of said ring, even were said blocks to be absent.

9. A steering joint comprising a pair of rods, the first of which has a loop on one end, the second said rod having a terminal stud at one end perpendicular to said second rod and extending into said loop along the axis of the loop, and an elastomeric connecting means within said loop interposed between and molded and bonded to both said loop and said stud, said connection including diametrically opposite loading portions spaced apart by diametrically opposite apertures defining voids, the said rod having said loop extending along the diametric axis of said loading portions, whereby said rods can rotate about said joint against relatively light force in the elastomeric connecting means but are restrained from translation of the two rods relative to each other by considerably greater elastomeric force.

10. The steering joint of claim 9 having fail-safe means on the opposite end of the stud from said second rod preventing retraction of said stud from said loop.

11. The steering joint of claim 9 wherein said loop has a generally rectangular cross-section and is axially longer along the axis of said stud than the height of said first rod.

12. The steering joint of claim 11 wherein the voids in said elastomeric connecting means comprises openings extending axially of said loop all the way through said connecting means and are centered along a diameter perpendicular to axis of said first rod.

References Cited by the Examiner

UNITED STATES PATENTS

| | | | |
|---|---|---|---|
| 1,867,540 | 7/1932 | Rosenberg | 64—11 X |
| 2,273,869 | 2/1942 | Julien. | |
| 2,324,984 | 7/1943 | Brown. | |
| 2,367,033 | 1/1945 | Lear | 287—85 |
| 2,958,526 | 11/1960 | Ulderup et al. | 267—63 |

FOREIGN PATENTS

| | | |
|---|---|---|
| 609,437 | 2/1935 | Germany. |
| 483,530 | 4/1938 | Great Britain. |
| 811,668 | 4/1959 | Great Britain. |

OTHER REFERENCES

Voigt: German application 1,039,314, printed Sept. 18, 1958.

CARL W. TOMLIN, *Primary Examiner.*

A. V. KUNDRAT, *Assistant Examiner.*